United States Patent
Laskaris et al.

(10) Patent No.: US 6,922,885 B2
(45) Date of Patent: Aug. 2, 2005

(54) HIGH TEMPERATURE SUPERCONDUCTING RACETRACK COIL

(75) Inventors: Evangelos Trifon Laskaris, Schenectady, NY (US); James Pellegrino Alexander, Ballston Lake, NY (US); Richard Andrew Ranze, Scotia, NY (US)

(73) Assignee: General Electric Company, Schenectady, NY (US)

( * ) Notice: Subject to any disclaimer, the term of this patent is extended or adjusted under 35 U.S.C. 154(b) by 361 days.

(21) Appl. No.: 09/854,464

(22) Filed: May 15, 2001

(65) Prior Publication Data

US 2002/0170166 A1 Nov. 21, 2002

(51) Int. Cl.⁷ .............................. H01F 7/06; H01F 7/127
(52) U.S. Cl. ......................... 29/605; 29/599; 505/166; 505/211; 174/125.1
(58) Field of Search .................. 29/605, 599; 505/166, 505/211, 704; 174/125.1

(56) References Cited

U.S. PATENT DOCUMENTS

| | | | |
|---|---|---|---|
| 3,665,595 A | * | 5/1972 | Tanaka et al. |
| 3,713,211 A | * | 1/1973 | Freeman, Jr. |
| 4,279,944 A | | 7/1981 | Laskaris |
| 5,102,483 A | * | 4/1992 | Sawada et al. |
| 5,173,678 A | * | 12/1992 | Bellows et al. |
| 5,187,859 A | * | 2/1993 | Heim ........................ 29/605 X |
| 5,293,524 A | * | 3/1994 | Mookerjee et al. |
| 5,434,129 A | * | 7/1995 | Motowidlo et al. ..... 505/704 X |
| 5,504,984 A | * | 4/1996 | Yamada et al. ................ 29/599 |
| 5,532,663 A | | 7/1996 | Herd et al. |
| 5,548,168 A | | 8/1996 | Laskaris et al. |
| 5,672,921 A | | 9/1997 | Herd et al. |
| 5,758,405 A | * | 6/1998 | Bent et al. ..................... 29/599 |
| 5,774,032 A | | 6/1998 | Herd et al. |
| 5,777,420 A | | 7/1998 | Gamble et al. |
| 5,798,678 A | | 8/1998 | Manlief et al. |
| 5,902,774 A | * | 5/1999 | Muranaka et al. ........ 29/599 X |
| 5,953,224 A | | 9/1999 | Gold et al. |
| 6,066,906 A | | 5/2000 | Kalsi |
| 6,140,719 A | | 10/2000 | Kalsi |
| 6,147,033 A | * | 11/2000 | Youm et al. |
| 6,169,353 B1 | | 1/2001 | Driscoll et al. |
| 6,173,577 B1 | | 1/2001 | Gold |
| 6,192,573 B1 | * | 2/2001 | Hahakura et al. ............. 29/599 |
| 6,397,454 B1 | * | 6/2002 | Seuntjens et al. ............. 29/599 |
| 6,444,917 B1 | * | 9/2002 | Scudiere et al. |
| 2002/0053889 A1 | | 5/2002 | Gold .......................... 318/154 |
| 2002/0149453 A1 | * | 10/2002 | Snitchler et al. |

FOREIGN PATENT DOCUMENTS

| | | |
|---|---|---|
| DE | 199 43 783 | 3/2001 |
| JP | 5-284730 | 10/1993 |

OTHER PUBLICATIONS

Fast, Reactive Power Support, *HTS Generators*, American Superconductor™(Feb. 27, 2001)pp. 1–4.

* cited by examiner

*Primary Examiner*—Ljiljana Ciric
(74) *Attorney, Agent, or Firm*—Nixon & Vanderhye P.C.

(57) ABSTRACT

A racetrack shaped high temperature superconducting (HTS) coil is fabricated by layer winding HTS tape under tension on a precision coil form with a binder such as pre-preg filament-ply interlayer insulation. The coil form includes a racetrack shaped bobbin, two side plates and a series of blocks that define the outside surface of the coil. The outside surface of the winding is over-wrapped with a copper foil bonded to heat exchanger tubing. The coil is baked in the coil form to cure the epoxy then released from the coil form. The resulting coil structure is a strong winding composite built to close tolerance dimensions.

7 Claims, 1 Drawing Sheet

HIGH TEMPERATURE SUPERCONDUCTING RACETRACK COIL

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings", filed May 15, 2001 ;

U.S. patent application Ser. No. 09/854,933 entitled "High Temperature Super-Conducting Rotor Coil Support With Split Coil Housing And Assembly Method", filed May 15, 2001 ;

U.S. patent application Ser. No. 09/854,931 entitled "Synchronous Machine Having Cryogenic Gas Transfer Coupling To Rotor With Super-Conducting Coils", filed May 15, 2001 ;

U.S. patent application Ser. No. 09/855,026 entitled "High Temperature Super-Conducting Synchronous Rotor Coil Support With Tension Rods And Method For Assembly Of Coil Support", filed May 15, 2001 ;

U.S. patent application Ser. No. 09/854,946 entitled "High Temperature Super-Conducting Rotor Coil Support With Tension Rod And Bolts And Assembly Method", filed May 15, 2001 ;

U.S. patent application Ser. No. 09/854,939 entitled "High Temperature Super-Conducting Coils Supported By An Iron Core Rotor", filed May 15, 2001 ;

U.S. patent application Ser. No. 09/854,938 entitled "High Temperature Super-Conducting Synchronous Rotor Having An Electrmagnetic Shield And Method For Assembly", filed May 15, 2001 ;

U.S. patent application Ser. No. 09/854,940 entitled "High Temperature Super-Conducting Rotor Coil Support And Coil Support Method", filed May 15, 2001 ;

U.S. patent application Ser. No. 09/878,327 entitled "Account Management System", filed May 15, 2001 ;

U.S. patent application Ser. No. 09/854,937 entitled "High Temperature Super-Conducting Rotor Having A Vacuum Vessel And Electromagnetic Shield And Method For Assembly", filed May 15, 2001 ;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001 ; and U.S. patent application Ser. No. 09/855,034 entitled "High Temperature Superconducting Rotor Power Leads", filed May 15, 2001 .

BACKGROUND OF THE INVENTION

The present invention relates generally to a superconductive coil in a synchronous rotating machine. More particularly, the present invention relates to an apparatus and method for manufacturing superconducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron-core rotor.

Conventional copper windings are commonly used in the rotors of synchronous electrical machines. Electrical resistance of copper windings, however, is sufficient (although low by conventional measures) to contribute to substantial heating of the rotor and to diminish the power efficiency of the machine. Recently, superconducting coil windings have been developed for rotors, which have effectively no resistance and are highly advantageous rotor coil windings.

High temperature superconducting coils used as the rotor field windings of the electrical machine must be designed as rigid structures made with precise dimensional tolerances so that the structural support can fit to the coil without excessive clearances that may result in high strain and potential damage to the coil during loading. The spring back of the tape conductor as it is wound on the straight sections of a racetrack coil form results in poor packing factor and lower strength of the composite compared to the circular sections.

Typical superconductor rotor windings are made from saddle-shaped coils that are assembled around cylindrical shells for structural support. These saddle-shaped coils are complex winding structures that may result in overstraining the high temperature superconducting (HTS) tape conductor by the winding operation as a result of tight bend diameters, twisting of leads, and differential thermal strain of the winding relative to the support structure during cool down.

BRIEF SUMMARY OF THE INVENTION

In an exemplary embodiment of the invention, an apparatus for manufacturing HTS coils includes two side plates disposed in facing relation, a preferably racetrack-shaped bobbin disposed between the side plates that receives layers of HTS tape interposed with a binder, and a plurality of blocks assembled adjacent an outer edge of the side plates. The blocks are displaceable toward the bobbin to compress the layers of HTS tape on the bobbin. The plurality of blocks may be assembled on the outer edge of the side plates via bolts. In this context, the bolts are sized to stepwise compress the layers of HTS tape. Alternatively, the blocks may include blocks of different thicknesses for selective compressing according to a number of layers of the HTS tape. Still further, the plurality of blocks may include a plurality of final blocks that are shaped according to desired outside dimensions of the superconducting coils. The binder may be any suitable material and preferably includes pre-preg filament-ply interlayer insulation or a thermoplastic material.

In another exemplary embodiment of the invention, a method of manufacturing HTS coils is performed with the apparatus of the invention. The method includes the steps of (a) winding HTS tape onto the bobbin, (b) applying a binder to the wound HTS tape, (c) compressing the HTS tape and the binder against the bobbin with the plurality of blocks, and (d) baking the compressed HTS tape and the binder to thereby cure the binder. Steps (a), (b) and (c) may be practiced for each layer of HTS tape. Alternatively, steps (b) and (c) may be practiced after winding multiple layers of the HTS tape. In this context, step (b) may be practiced by epoxy-impregnating the wound multiple layers of the HTS tape by a vacuum pressure impregnation process. Still further, step (a) in this context may be practiced using HTS tape with a pre-preg coating.

The method may further include, prior to step (a), the step of securing a start lead of the coil to a lead terminal on one of the two side plates and applying a binder layer to the bobbin. In this context, prior to step (d), the method may additionally include the step of securing a finished lead of the coil to a lead terminal on the other of the two side plates, applying a layer of copper foil to the coil with a rectangular cooling heat exchanger tube bonded thereto, and repeating step (c) under heat.

DETAILED DESCRIPTION OF THE INVENTION

Figure 1:
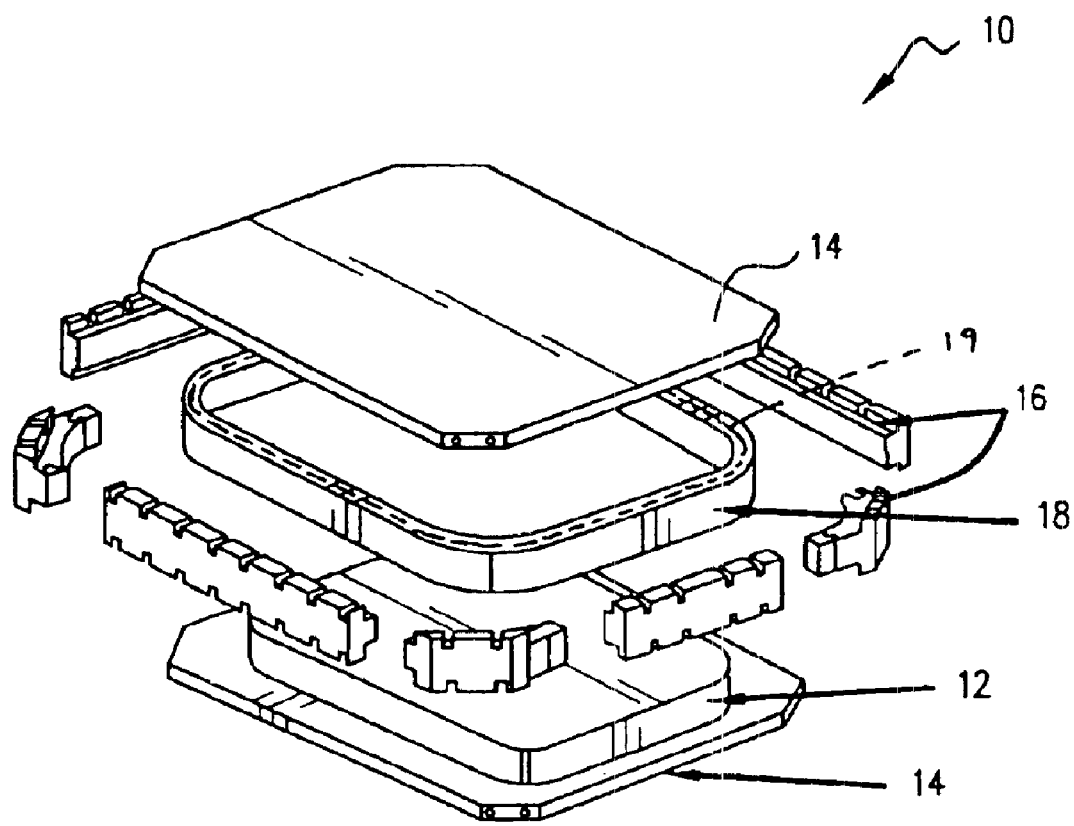
FIG. 1 is an assembly drawing showing the apparatus and method for manufacturing HTS racetrack coil of the invention.
Figure 2:
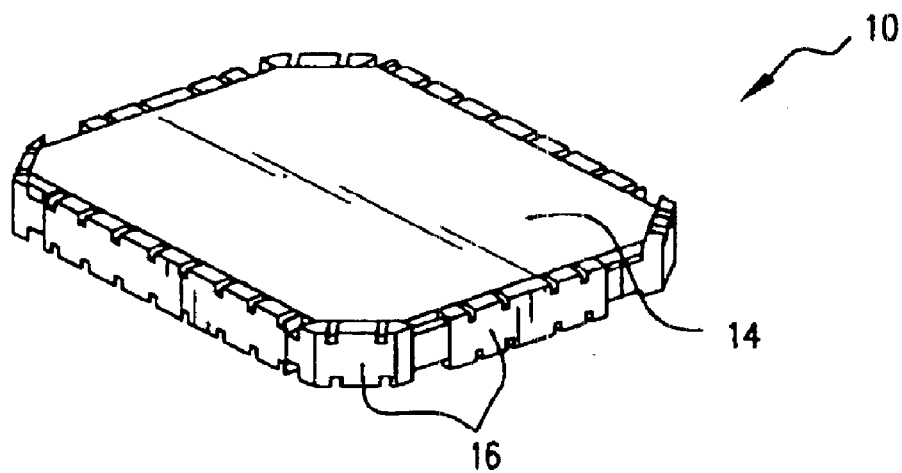
FIG. 2 is a perspective view of the apparatus.

FIGS. 1 and 2 illustrate a precision coil form 10 used for fabricating high temperature superconducting (HTS) coil. The HTS coil is typically layer wound with HTS tape under tension on the coil form and is epoxy-impregnated and compressed to attain close dimensional tolerances. Several types of HTS tape are known, and any suitable HTS tape could be used in the manufacture of the HTS coil of the invention.

The coil form 10 includes a racetrack-shaped bobbin 12 with substantially straight sides as shown and two side plates 14 that are disposed in facing relation surrounding the bobbin 12. The plates 14 may include impregnation holes (not shown) to effect post-compression epoxy impregnation of the HTS tape winding. A series of blocks 16 are assembled on an outer edge of the side plates 14 and are displaceable toward and away from the bobbin 12 via bolts or the like. The HTS tape winding is shown in FIG. 1 at 18.

In manufacturing the HTS coil, a start lead of the coil is soldered to a lead terminal, such as a copper lead terminal or the like, that is secured to one of the side plates 14 near the center line axis of the coil. A layer of binder 19 such as pre-preg filament plies or a thermoplastic material such as polyester is applied on the bobbin 12, then a first layer of the HTS tape is wound. The blocks 16 are bolted on the side plates 14, particularly at least the straight blocks, to compress the straight sections of the first layer against the bobbin 12 so that the first layer of tape, the pre-preg layer, and the bobbin 12 all stick together. A second layer of binder material (pre-preg filament plies) is applied on top of the first tape layer, then a second layer of HTS tape is wound. The same series of straight blocks 16 is used to compress the winding 18 against the bobbin 12 so that all the layers stick together. The layer winding process continues until the last odd number layer is complete, and a finish lead is soldered to a copper lead terminal that is secured to the other of the side plates 14 near the center line axis of the coil.

A layer of pre-preg filament plies is then applied on the outside surface of the complete winding followed by a layer of copper foil with a rectangular cooling heat exchanger tube bonded on the outside surface. A series of straight blocks and corner blocks 16 (as shown in FIG. 1) are assembled to the outside surface of the copper foil via the side plates 14 to compress the complete coil as moderate heat is applied to precision shape the coil outside surface. The finished coil form and winding assembly is baked at uniform temperature to cure the pre-preg. The temperature varies according to a curing temperature of the particular material. The resulting coil structure is a strong winding composite built to close tolerance dimensions.

In the manufacturing process, the bolts that secure the blocks 16 to the side plates 14 may be sized to effect stepwise compression of the layers of HTS tape. In this manner, only one production set of blocks 16 is required as the bolts enable stepwise compression of the HTS tape as the layers are formed. Alternatively, the plurality of blocks may include blocks of different thicknesses for selective compressing according to a number of layers of the HTS tape. The blocks may additionally include a plurality of final blocks that are shaped according to a desired outside diameter of the superconducting coils (as shown in FIG. 2) to effect a precisely sized coil form.

In a variation of the winding fabrication process, a pre-preg coating on the HTS tape insulation is used, thereby eliminating the interlayer pre-preg filament plies. The resulting coil structure has higher packing factor of HTS tapes, resulting in higher winding current density. In another alternative, glass insulated HTS tape can be used with a fast curing adhesive to bond and compress each layer to the one before at discrete locations. Subsequently, the complete winding is epoxy-impregnated by a vacuum pressure impregnation process. The vacuum pressure impregnation process is known, and details thereof will not be provided.

With the structure and method of the present invention, each layer of wound HTS tape can be bonded and compressed with the one before so that spring back of the tape on at least the straight sections is eliminated, thus preventing poor packing factor, reduced current density and inferior strength properties of the winding composite. The HTS coil fabricated with the apparatus and method of the invention results in a precision coil form that prevents high strains and potential damage to the coil during loading.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of manufacturing high temperature superconducting coils with an apparatus including two side plates diposed in facing relation, a bobbin disposed between the side plates, and a plurality of blocks assembled a jacent an outer edge of the side plates, the blocks being displaceable toward and away from the bobbin, the method comprising:
   (a) winding high temperature superconducting tape onto the bobbin;
   (b) applying a binder to the wound high temperature superconducting tape;
   (c) compressing, with the plurality of blocks, the high temperature superconducting tape and the binder against the bobbin; and
   (d) baking the compressed high temperature superconducting tape and the binder to thereby cure the binder.

2. A method according to claim 1, wherein steps a), (b) and (c) are practiced for multiple layers of the high temperature superconducting tape one layer at a time.

3. A method according to claim 1, wherein steps b) and (c) are practiced after winding multiple layers of the high temperature superconducting tape.

4. A method according to claim 3, wherein step (b) is practiced by epoxy-impregnating the wound multiple layers of the high temperature superconducting tape by a vacuum pressure impregnation process.

5. A method according to claim 3, wherein step (a) is practiced using high temperature superconducting tape with a pre-preg coating.

6. A method according to claim 1, wherein the bobbin is racetrack shaped with substantially straight sides, and wherein step (c) is practiced by compressing the HTS tape and the binder against the straight sides of the bobbin.

7. A method of manufacturing high temperature superconducting coils, the method comprising:

(a) winding a first layer of high temperature superconducting tap onto a bobbin;

(b) applying a binder to the wound high temperature superconduting tape;

(c) compressing the high temperature superconducting tape and the binder;

(d) winding a next layer of high temperature superconducting tape onto the bobbin;

(e) repeating steps (b), (c) and (d) until a desired number of high temperature superconducting tape layers are wound onto the bobbin; and (f) baking the layers of compressed high temperature superconducting tape and the binder to thereby cure the binder.

* * * * *

UNITED STATES PATENT AND TRADEMARK OFFICE
CERTIFICATE OF CORRECTION

PATENT NO. : 6,922,885 B2
DATED : August 2, 2005
INVENTOR(S) : Laskaris et al.

It is certified that error appears in the above-identified patent and that said Letters Patent is hereby corrected as shown below:

Column 1,
Line 35, delete "Electrmagnetic" and insert -- Electromagnetic --.

Column 4,
Line 42, delete "diposed" and insert -- disposed --.
Line 43, delete "a jacent" and insert -- adjacent --.
Line 55, delete "a)" and insert -- (a) --.
Line 58, delete "b)" and insert -- (b) --.

Column 5,
Line 8, delete "tap" and insert -- tape --.
Line 10, delete "superconduting" and insert -- superconducting --.

Signed and Sealed this

Fourth Day of October, 2005

JON W. DUDAS
*Director of the United States Patent and Trademark Office*